J. E. A. GIBBS.
SEWING MACHINE.
No. 573. Reissued July 13, 1858.
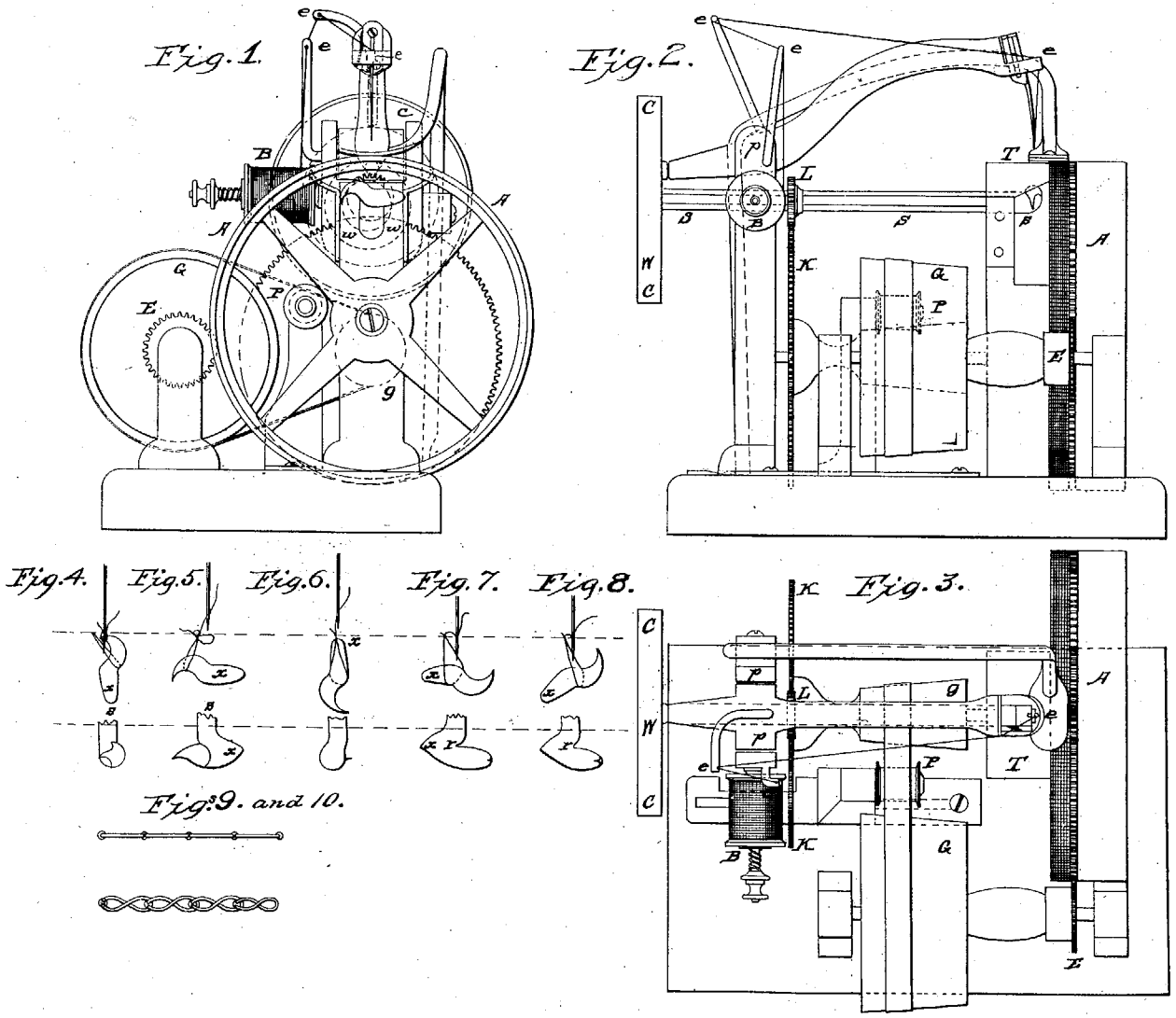
THE NORRIS PETERS CO., PHOTO-LITHO., WASHINGTON, D. C.

UNITED STATES PATENT OFFICE.

JOHN A. RUCKMAN, OF MILLPOINT, VIRGINIA, ASSIGNEE OF JAS. E. A. GIBBS, OF SAME PLACE.

IMPROVEMENT IN SEWING-MACHINES.

Specification forming part of Letters Patent No. 17,427, dated June 2, 1857; Reissue No 573, dated July 13, 1858.

*To all whom it may concern:*

Be it known that JAMES E. A. GIBBS, of Millpoint, in the county of Pocahontas and State of Virginia, has invented certain new and useful Improvements in Sewing-Machines; and I do hereby declare that the following is a full, clear, and exact description thereof, reference being had to the accompanying drawings, which form part of this specification, and in which the several figures, from 1 to 10, inclusive, represent elevations, plan and detail views of a sewing-machine constructed according to his invention.

It is an acknowledged distinct subject-matter of invention when referring to single or double thread sewing-machines, or when referring to a machine for making one form of a stitch as compared with another machine for making a different kind of stitch, whether a single or double thread be used. Such differences are distinct and positive, and serve to discriminate in the art of sewing by machinery between peculiarities almost as distinct as sewing is distinct from weaving.

The present improvement relates to that description of sewing by machinery which is known as the "single-thread chain-stitch," and no allusion here is necessary, under the recognized division above specified, to any other than such single-thread machines as produce a chain-stitch. This form of stitch is so old and well known that it need scarcely be described as consisting of a series or succession of loops, each successive loop passing through the preceding, and thereby preventing it from being drawn out. Such stitch has a neatness, strength, and value peculiarly its own, and is an acknowledged superior form of stitch for the simple single-thread machine. The various contrivances which have been adopted for operation in connection with the needle to produce this stitch consist in reciprocating or partially revolving hooks, which, catching the one loop formed by the needle in its passage through the cloth, hold and turn the loop for the succeeding loop to pass through it. Such reciprocating or reversing action of the hook or looper has many disadvantages, especially in rapid sewing, and the means to secure such action are very often complicated, unreliable or variable, and not durable. A stationary hook or looper, combined with a peculiar action to the needle, has also been invented and patented; but I need not refer to such an arrangement here, the present improvement relating to a traveling hook or looper; and, strange as it may appear, but not so remarkable when the difficulty to be encountered is considered, though hooks or loopers revolving continuously or in the same direction have before been used in combination with shuttles or thread-cases—that is, in double-thread machines and in single-thread machines for making a different kind of stitch—a hook or looper having such a direct or positive and advantageous course of action or run has never, previously to this invention, been used in single-thread machines for making a chain or crochet stitch. But this invention is not the mere application of a hook always traveling in the same direction. A peculiarity of construction is necessary for the action of such hook in concert with the needle to produce a chain-stitch. It is not sufficient that the revolving hook should merely catch and distend or spread the loop, as in the case of double-thread machines, for the passage of the shuttle or thread-case, with its locking-thread, through the loop, but in addition to pulling the loop open, or pulling on the open loop, the hook must draw the loop sidewise and spread the loop open in the path of the needle, for the passage of the succeeding loop formed out of the same thread therethrough, and the hook must so operate on the several loops and release and take up new loops in rapid succession. This is a delicate and difficult duty for a hook traveling in one direction only to perform in concert with a reciprocating needle that, in addition to passing the loop through the cloth, has, in either its advance or receding movement, also to draw up or tighten the double-loop lock or chain stitch; and I here show an arrangement of such operating hook and needle in which the loop is drawn from the needle by the hook, also spread, and twisted, and held distended in the path of the needle until a fresh loop is taken by the hook, and the former loop afterward released from the hook and drawn up by the retreat of the needle, and find the same to be a good working arrangement for many purposes; but it is not in all cases absolutely necessary that the two loops should be on the hook at the one time.

Referring to the accompanying drawings, the thread may be conducted to the needle from the bobbin B by passing through eyes *e*, as shown in Figs. 1, 2, and 3. The needle may be connected with the needle-arm by a yielding joint, which admits of the needle having a vibratory motion in the direction of the feed upon the needle-head as a center of oscillation. The needle-arm is shown pivoted at *p*, and may receive its vibratory or reciprocating up-and-down motion from a suitably-constructed wheel, W, into which the tail of the needle-arm plays or gears with. This wheel W is shown as placed eccentrically upon a circular disk, C, which is supported on the center by a shaft, S, to which it is connected. By these means every revolution of the shaft S produces a vibration of the needle-arm, or, in other words, a needle-stroke.

The shaft S may revolve upon two fixed bearings, and is arranged to cross the machine from the rear toward the front, where it terminates in a peculiarly-constructed hook, the shape of which is more or less as shown in Figs. 4, 5, 6, 7, and 8 of the accompanying drawings, said figures representing the hook in different positions which it assumes during each revolution, as referred to hereinafter in the description of the series of operations the hook has to perform.

The hook is shown as so arranged in relation to the needle that when the latter shall have reached its lowest point of stroke the hook is just facing the loop which the needle has brought through the cloth. The needle, then ascending the loop, is loosened and opened, and the hook, which simultaneously advances, penetrates the loop, as shown in Fig. 4. The loop is next gradually spread by the hook during the succeeding portion of its revolution. Said hook is shown constructed as gradually swelling in thickness and of concave form where the loop is in contact, for the purpose of avoiding the drawing of more thread than is necessary. After the loop has thus been drawn open it slips off the hook and lodges in an angular recess or groove, *r*. This takes place during the time the hook is revolving from the position it is shown to occupy in Fig. 5 to the position it is represented in in Fig. 6. The loop is then twisted—that is, the line of thread which was behind the needle is brought to the front, while the line of thread which was in front of the needle is turned toward the rear of the loop. This is effected by a spur or cast-off, *x*, said cast-off being so arranged in relation to the hook and angular recess *l* that the loop is spread for the hook's nose to pass through on taking a fresh loop from the needle. At this juncture the hook has, or may have, two loops engaged—namely, the fresh loop at the nose of the hook, and the receding loop which bears against the convex part of the hook, as shown in Fig. 4. The next motion of the hook allows this latter loop to slip off entirely from the hook, as shown in Fig. 5, and said loop is then drawn tight by the drawing open of the new loops. Such is or may be the action for each revolution of the hook.

From the above description it will be seen that the stitch has somewhat of a different appearance from the ordinary chain-stitch, the loops having been twisted half of a revolution, or one hundred and eighty degrees, between each successive stitch. This stitch, as shown in Figs. 9 and 10, has the advantage of being stronger and more compact than the ordinary chain-stitch; also, of forming a sort of knot between each stitch to restrain the thread from being drawn out of the seam by pulling on it at one end.

The machine may be operated by drawing the cloth to be sewed under the needle; or, in other words, the whole force required to drive the machine may be applied directly to the cloth itself, which transmits its movement to the mechanism operating the machine. Thus a wheel, A, may be arranged the outer periphery of which is flush with the sewing-table T, of which the wheel may be said to form a part.

A portion of the rim of the wheel is roughened, upon which the cloth to be sewed is placed and pressed by means of a permanent spring-pressure pad or roller, or their equivalents. This wheel gears into a pinion, E, the shaft of which carries a conical drum, G.

An endless band passing over a regulating-pulley, P, connects the drum G with another conical drum, *g'*, the latter being at some distance from the former, but the axes of both being parallel to each other. The second conical drum, *g'*, is fixed upon a shaft, which carries a cog-wheel, K, that gears with a pinion, L, which is secured onto the hook-shaft. The diameter and relative arrangements of these several wheels, pinions, and drums have to be such as to suit convenience and required speed. The length of stitch depends upon the velocity of the roughened wheel A in relation to that of the hook. Said wheel therefore is so arranged that its speed can be regulated by varying the position of the endless band on the conical drums. This may be effected by adjusting the regulating-pulley P to different points in a line parallel to the axes of the cones. The driving arrangement, however, of the hook and needle and feed of the cloth may be varied at pleasure.

Having thus fully described the improvement in sewing-machines for which I desire to secure renewed Letters Patent, I shall set forth the claims as follows.

1. In single-thread sewing-machines, a hook or looper revolving in one direction only, being so constructed as to make a series of chain-stitches when operating in connection with a reciprocating needle.

2. The peculiar construction, substantially as herein described, of a revolving hook, whereby while one loop is taken from the needle by the hook, spread, twisted, and held distended in the path of the needle until another or fresh loop is taken, the former loop shall be released and drawn up during the retreat of the needle.

In testimony whereof I have signed my name to this specification before subscribing witnesses.

JOHN H. RUCKMAN.

Witnesses:
C. W. BEARD,
A. D. AMISS,
JOHN J. KELLISON.